March 21, 1933.  C. BLOMSTROM  1,902,157
MEASURING AND DISPENSING DEVICE FOR RECEPTACLES
Filed Oct. 3, 1931
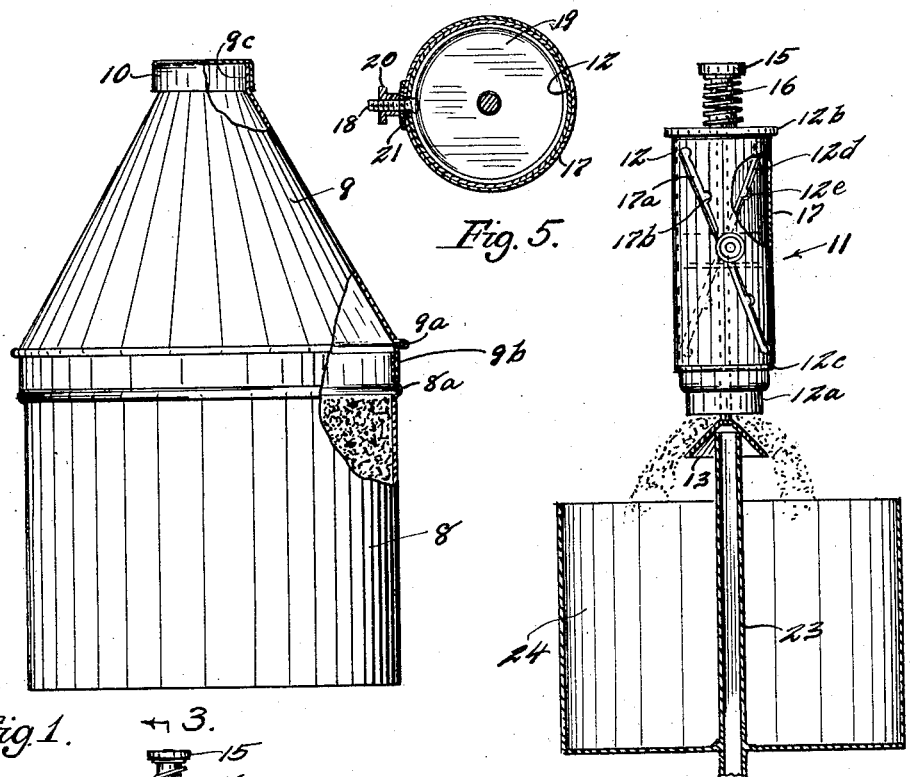
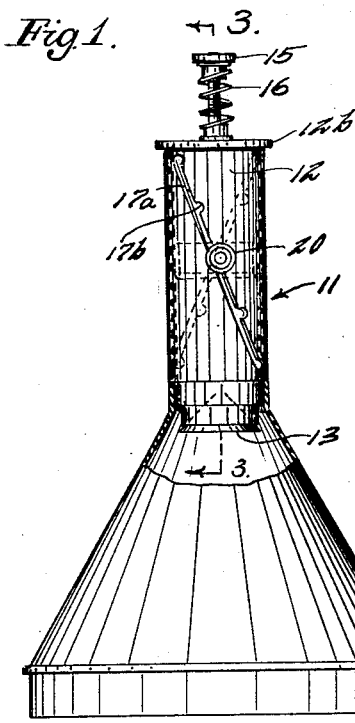
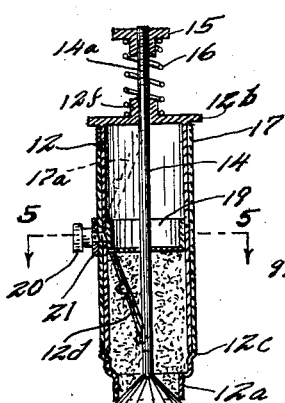
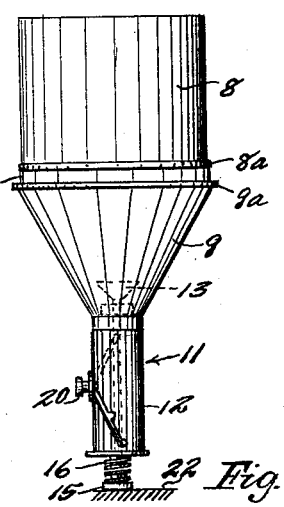
INVENTOR
CHARLES BLOMSTROM
BY
ATTORNEY Patented Mar. 21, 1933

1,902,157

UNITED STATES PATENT OFFICE

CHARLES BLOMSTROM, OF MINNEAPOLIS, MINNESOTA

MEASURING AND DISPENSING DEVICE FOR RECEPTACLES

Application filed October 3, 1931. Serial No. 566,608.

This invention relates to a receptacle adapted to hold pulverulent fluent material, and to a dispensing and measuring means used in connection with said receptacle. While the device is capable of use with many receptacles adapted to hold different materials, one particular use thereof is in connection with a coffee can or receptacle.

Coffee is now placed on the market in large quantities, the coffee being ground and contained in tin cans or receptacles, the same usually being provided with a removable lid. In the use of the can and coffee, the user usually takes the coffee from the can with a spoon and transfers the same to a coffee pot or percolator. This method of transferring and measuring the coffee is not accurate and frequently results in spilling the coffee about the place where it is handled.

It is desirable to have some simple means for accurately measuring and transferring the coffee to the coffee pot or percolator, which can conveniently be used in connection with the coffee can or receptacle.

It is an object of this invention, therefore, to provide a device adapted to be placed on the receptacle when the lid is removed, with which cooperates a measuring device by means of which the coffee can be measured and transferred to the coffee pot or percolator.

It is a further object of the invention to provide a member adapted to fit the receptacle as a lid, said member converging to a comparatively small discharge outlet, thus being frusto-conical in form, together with a measuring device adapted to fit said discharge outlet, and having a movable valve adapted to be opened for the device to receive the coffee and to be closed for the device to retain the coffee while it is being transferred.

It is a further object of the invention to provide such a measuring device having means for varying its capacity, and also preferably for centering the means on the tube of a percolator coffee holder.

These and other objects and advantages of the invention will be fully set forth in the following description made in connection with the accompanying drawing, in which like reference characters refer to similar parts throughout the several views and in which:—

Fig. 1 is a view in side elevation, showing the coffee can or receptacle with the dispensing member thereon, some parts being broken away and others shown in vertical section;

Fig. 2 is a view in side elevation of the discharge member with the measuring device therein, some parts being broken away and others shown in vertical section;

Fig. 3 is a vertical section through the measuring device taken on line 3—3 of Fig. 1, as indicated by the arrows;

Fig. 4 is a view in side elevation of the measuring device with some parts in vertical section showing the same in connection with a percolator receptacle shown in central vertical section;

Fig. 5 is a horizontal section taken on line 5—5 of Fig. 3, as indicated by the arrows; and Fig. 6 is a view in side elevation of the receptacle, discharge member and measuring device, illustrating one method of use thereof.

Referring to the drawing, a receptacle 8 is shown, and while the receptacle might be variously shaped, in the embodiment of the invention illustrated it is shown as a cylindrical vessel having an open upper end and a bead 8a pressed outward thereon a short distance from said upper end. Such a receptacle or can is now commonly used for marketing coffee in ground form. The receptacle is commonly provided with a lid (not shown) which fits over the upper end of the receptacle, the lower edge of the lid usually engaging the bead 8a.

In accordance with the present invention, a member 9 is provided, the same being shown as having a bead or rim 9a formed adjacent one end, from which bead extends a cylindrical portion 9b adapted to fit over the top of container 8. Member 9 has a frusto-conical portion extending from the rim 9a, which converges to a cylindrical portion 9c of comparatively small size which forms a discharge portion for said member. A lid or cover 10 is provided of cup shape, adapted to fit over the portion 9c to close member 9.

A measuring device designated generally as 11 is provided, and while this device might be made of various forms, in the embodiment of the invention illustrated it is shown as comprising a casing 12. Casing 12 is illustrated as of cylindrical form, having a closed upper end and an open lower end, said casing also being shown as having its lower end 12a of reduced diameter. The upper end of said casing has an outwardly extending flange 12b thereon. A valve member 13 is disposed to close the open lower end of casing 12 and this valve is shown as of conical shape and as being made of sheet material, so that it has a conical under surface. A rod 14 is secured centrally to the upper end of valve 13 and extends axially through the casing 12 and through the upper end thereof, the upper end thereof being threaded as shown at 14a. A handle in the shape of a knob 15 is threaded on rod 14, having a reduced lower portion thus forming a flange on member 15. A compression coil spring 16 engages said flange and surrounds the rod 14 between member 15 and the top of casing 12, the same fitting over a cylindrical projection 12f on the top of casing 12. A shell 17 is fitted over casing 12, being rotatable thereon, the lower edge of said shell engaging a bead 12c pressed outwardly on casing 12. The shell 17 has a slot 17a extending diagonally or helically thereof and spaced notches 17b are formed in said shell communicating with said slot. The casing 12 also has a slot 12d extending diagonally or helically thereof in a direction opposite to the slot 17a and slot 12d also has spaced notches 12e extending from the side thereof. A threaded pin 18 extends radially from the side of a cup-shaped partition 19 slidable longitudinally in casing 12, pin 18 projecting through slots 12d and 17a. A knob 20 is threaded on pin 18 and has a curved flange 21 adapted to fit tight against the side of the shell 17.

In operation, when a can of coffee is received, the lid furnished therewith will be removed and the member 9 will be placed thereon and the flange 9b will fit over the top of the can 8. The cap 10 may be placed on the small end of member 9 or the end may be closed by inserting a measuring device 11 as shown in Fig. 2. When it is desired to transfer coffee from the can to the coffee pot or percolator, the member 19 will be adjusted to give the desired measurement. Member 19 can be adjusted by loosening the knob 20 and then sliding member 19 in the casing 12, shell 17 revolving on casing 12. The slots 12e and 17b are provided to designate fixed points for the member 19, so that certain definite amounts will be measured. The pin 18 and disk 19 can be held in four different positions, thus giving four different measurements. When the disk 19 is in its lowest position with screw 18 in the lowermost notches 12e and 17b, the device may measure substantially a tablespoonful. With the disk 19 positioned as desired, the measuring device 11 will be placed in the top of member 9 and the receptacle and the measuring device will be inverted as shown in Fig. 6. If desired, the same can be inverted and pressed down on a surface 22 forming the top of the table or other object. Rod 14 is thus pressed toward the open end of casing 12 and valve 13 moves away from the edge of the portion 12a, thus forming an opening into said casing. The coffee or other material will now fall into the casing 12 and the same will be filled from the disk 19 to the bottom thereof. When the casing is filled, the operator lifts the measuring device or releases the pressure on rod 14 and valve 13 closes, due to the action of spring 16. If desired, the operator can pull outwardly on the knob 15 to be sure that valve 13 is tightly closed and not held partly open by any material between the same and the edge of the portion 12a. The measuring device 11 is now removed from member 9 and transferred to the coffee pot or percolator. If the coffee is to be discharged into a percolator, the measuring device is placed thereover as shown in Fig. 4 and the under surface of valve 13 forms a centering device in cooperation with the tube 23 of the percolator holder 24. The operator now presses downwardly on the knob 15 and valve 13 is again opened and the coffee discharged into the receptacle 24. The coffee is equally distributed by the conical valve 13 and falls to the bottom of the receptacle 24 in the form of a uniformly distributed pile or ring. After the coffee is discharged from the device 11, the latter can be again placed in the top of member 9 if desired and be ready for the next operation.

The washer or flange 21 acts to close any opening which might extend through the intersection of the slots 17a and 12d. This opening will, of course, be practically closed by the pin 18. The knob or handle 15 can be screwed more or less on the rod 14 and the tension of the spring 16 thus varied.

From the above description it is seen that applicant has provided quite a simple and efficient device which can readily be placed on the commercial coffee can receptacle or canister and by means of which the coffee can be dispensed and transferred to the percolator or coffee pot without the danger of being spilled. At the same time an accurate amount of coffee is measured and transferred and by this method coffee will be saved. The device is simple and efficient in construction and can be easily and inexpensively made. The parts are few and the device will be quite durable. The same has been amply demonstrated in actual practice and found to be very successful and efficient.

It will, of course, be understood that various changes may be made in the form, details, arrangement and proportions of the parts, without departing from the scope of applicant's invention, which generally stated consists in a device capable of carrying out the objects above set forth, in the parts and combinations of parts disclosed and defined in the appended claims.

What is claimed is:—

1. A measuring device having in combination, a cylindrical casing having an open lower end and a closed upper end, a valve for opening and closing said lower end, a shell on said casing and rotatable thereon, a partition in said casing slidable longitudinally thereof, said casing having a slot extending diagonally thereof, said shell having a slot extending diagonally in a direction opposite to said first mentioned slot, a pin secured to said partition and adapted to project through the casing and shell at the intersection of said slots, said shell having means indicating different positions of said partition, and means for holding said partition in one position whereby different amounts may be measured by said device.

2. A measuring device having in combination, a cylindrical casing having an open lower end and a closed upper end, a valve for opening and closing said lower end, a shell on said casing and rotatable thereon, a partition in said casing slidable longitudinally thereof, said casing and shell having slots therethrough, means secured to said partition extending through said slots for moving said partition, and means for holding said partition in fixed position.

3. A measuring device comprising a casing having a mouth adapted to fit the discharge opening of a receptacle to receive material therefrom, a valve for controlling passage of material through said mouth and movable into said receptacle to open the mouth, resilient means normally holding said valve in closed position, a partition in said casing movable to different positions for variably measuring material, and means carried by said casing for adjusting said partition.

4. A measuring device having in combination, a casing including a mouth adapted to fit a receptacle, said casing being otherwise closed, a valve at said mouth and movable longitudinally of said casing outwardly beyond the same, a rod secured to said valve and extending axially through said casing, a handle secured to the end of said rod, a spring associated with said handle for holding said valve in closed position, a partition in said casing through which said rod passes, and means extending through said casing for moving said partition to different positions in the casing and holding the same in said positions.

5. A measuring device having in combination, a casing providing a mouth, a valve for controlling the mouth of said casing, means for manipulating said valve, a partition slidable along the casing intermediate the ends thereof for varying the size of said casing, and means attached to said partition and supported by a wall of said casing for adjusting said partition longitudinally of the casing.

CHARLES BLOMSTROM.